(No Model.)
L. ADAMS.
VENT ATTACHMENT FOR PUMP PIPES.
No. 518,934. Patented May 1, 1894.
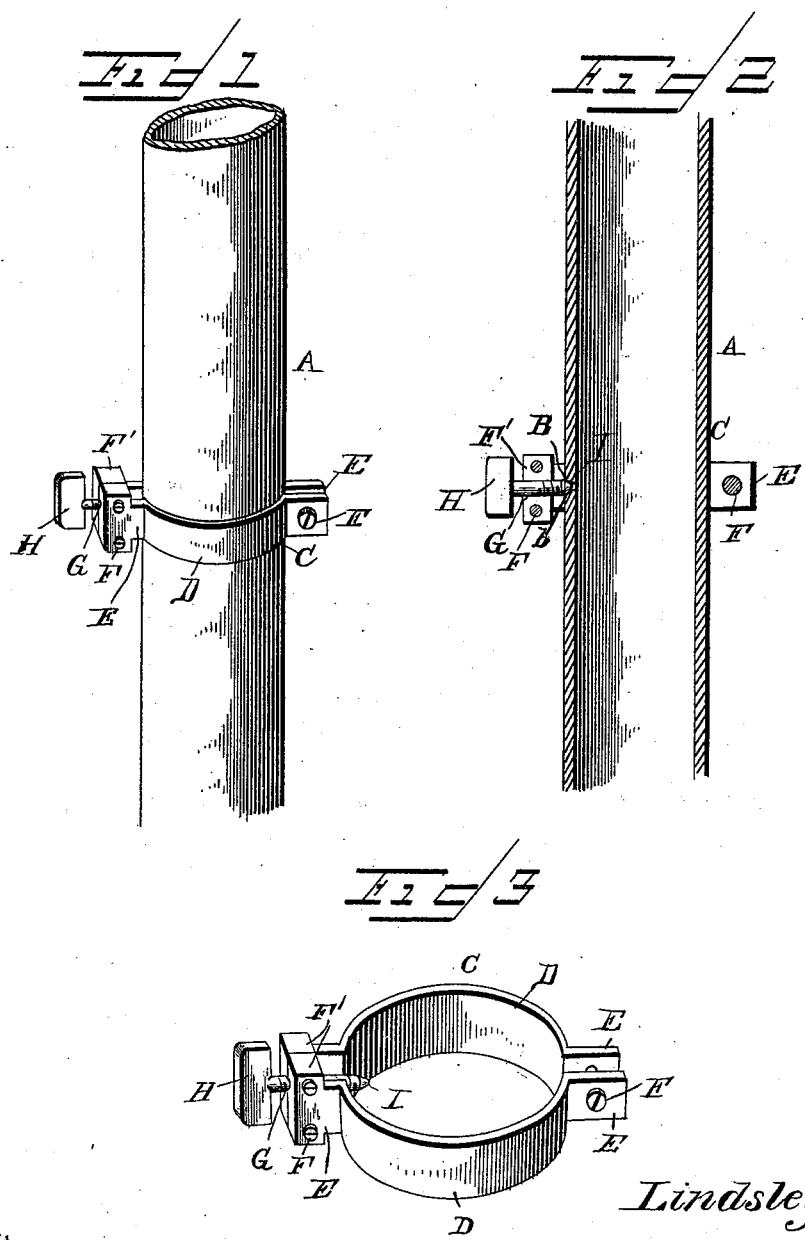
Witnesses
W. Schneider
Geo. C. Shoemaker
Inventor
Lindsley Adams.
By his Attorneys.
C. A. Snow & Co.
THE NATIONAL LITHOGRAPHING COMPANY,
WASHINGTON, D. C.

UNITED STATES PATENT OFFICE.

LINDSLEY ADAMS, OF ATLANTA, NEW YORK.

VENT ATTACHMENT FOR PUMP-PIPES.

SPECIFICATION forming part of Letters Patent No. 518,934, dated May 1, 1894.

Application filed October 31, 1893. Serial No. 489,627. (No model.)

*To all whom it may concern:*

Be it known that I, LINDSLEY ADAMS, a citizen of the United States, residing at Atlanta, in the county of Steuben and State of New York, have invented a new and useful Vent Attachment for Pump-Pipes, of which the following is a specification.

This invention relates to vent attachments for pump pipes; and it has for its object to provide an attachment of this character which is intended to be placed on driven well or cistern pipes to provide means for draining the same of standing water, whenever desired, and thereby preventing the water from freezing or fouling in the pipes.

To this end the main and primary object of the present invention is to provide a simple attachment of this character capable of being readily applied to any driven well or cistern pipe.

With these and other objects in view which will readily appear as the nature of the invention is better understood, the same consists in the novel construction, combination and arrangement of parts hereinafter more fully described, illustrated and claimed.

In the drawings:—Figure 1 is a perspective view of a section of a pump pipe provided with a vent attachment constructed in accordance with this invention. Fig. 2 is a vertical longitudinal sectional view of the construction shown in Fig. 1. Fig. 3 is a detail in perspective of the attachment removed from the pump pipe.

Referring to the accompanying drawings, A represents a section of an ordinary pump pipe of a driven well or cistern, and said pipe is provided at any suitable exposed portion, below the pump, with a side drain or vent opening B, beveled at its outer edge as at b. The said pump pipe A, is adapted to be embraced at the point where the drain or vent opening is located by the sectional attachment clamp C. The sectional attachment clamp C, comprises the separate separable curved members D, adapted to fit exteriorly on the pipe A, and provided at their extremities with the projected screw lugs E, which receive the clamping screws F, for securing the attachment clamp firmly in position on the pump pipe at the proper point. The screw lugs E, at one side of the attachment clamp are thickened to abut and form a substantially solid bearing piece F', which is provided at a convenient point with a threaded opening G, adapted to receive the thumb valve screw H. The thumb valve screw H is adapted to engage the threaded opening G, of the attachment clamp, in a line with the beveled drain or vent opening B, and is provided with a tapered point I, which registers with said drain or vent opening and forms a closed joint therewith when the screw is tightened, in order to render the pump pipe perfectly air tight. It will of course be understood that by turning the thumb screw in a direction to carry it away from the pump pipe, the drain or vent opening B, is uncovered so as to permit the air to enter and allow the standing water in the pipe to drain out, thus providing means for preventing the pipes from freezing as well as the possibility of the water fouling.

While I have illustrated the thickened screw lugs of the clamp held together by two screws with the thumb valve screw H, arranged there-between, still it will of course be understood that the valve screw may be arranged above or below the clamping screws, and only one of such clamping screws employed if found desirable or expedient, the object of the invention being to provide convenient means for readily attaching the clamp to the pump pipe at any position thereon, while at the same time permitting the valve screw to be mounted in the bearing piece of the clamp so as to be easily manipulated.

Changes in the form, proportion and the minor details of construction may be resorted to without departing from the principle or sacrificing any of the advantages of this invention.

Having thus described the invention, what is claimed, and desired to be secured by Letters Patent, is—

In a vent attachment for pumps, the combination with a pump pipe having a side drain or vent opening; of a sectional attachment clamp comprising separate separable curved members provided at their extremities with parallel projected screw lugs, said screw lugs at one side being thickened to abut and form a substantially solid bearing piece having a threaded screw opening formed in the meeting faces of said thickened lugs, clamping screws removably engaging the screw lugs to bind the clamp on the pump pipe, and a thumb valve screw arranged in said threaded screw opening and having a point adapted to be moved into and out of said drain or vent opening, substantially as set forth.

In testimony that I claim the foregoing as my own I have hereto affixed my signature in the presence of two witnesses.

LINDSLEY ADAMS.

Witnesses:
A. R. WETMORE,
HENRY WOLFANGER.